Feb. 7, 1950            F. KRAEMER            2,496,545
LATHE CHUCK
Filed Nov. 21, 1946            2 Sheets-Sheet 1
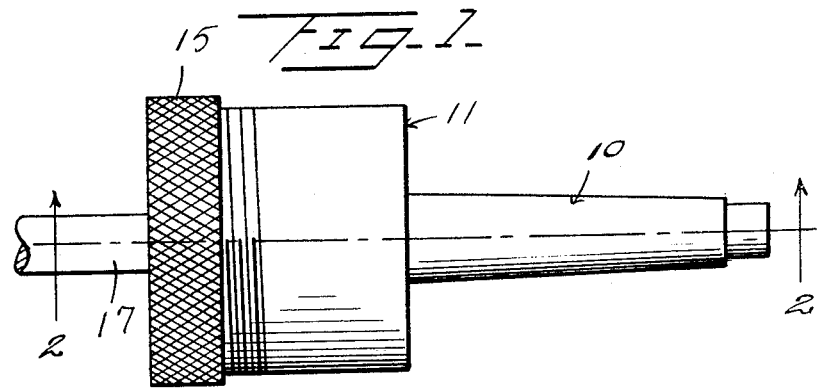
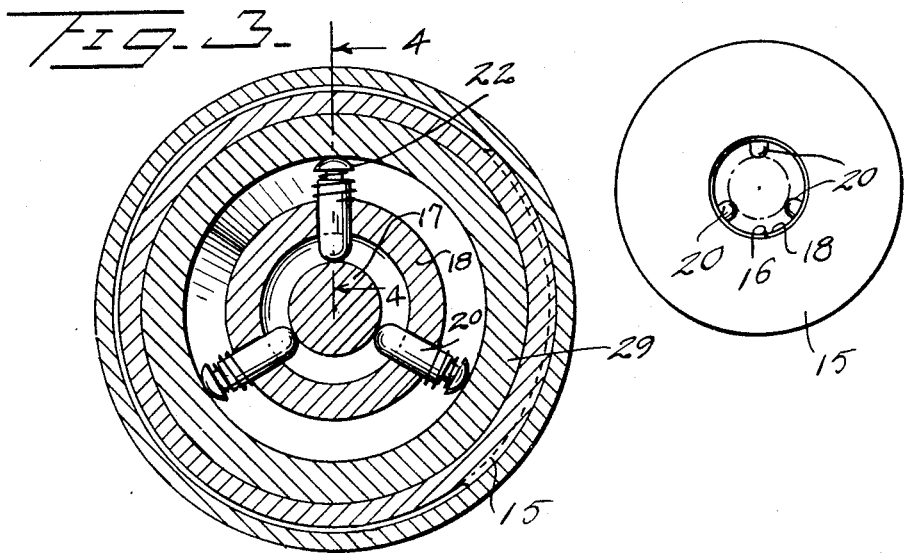
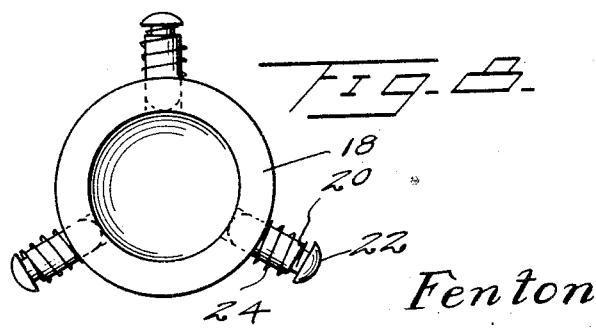
Inventor
Fenton Kraemer
By
Kimmel & Crowell Attorneys Feb. 7, 1950 F. KRAEMER 2,496,545
LATHE CHUCK
Filed Nov. 21, 1946 2 Sheets-Sheet 2
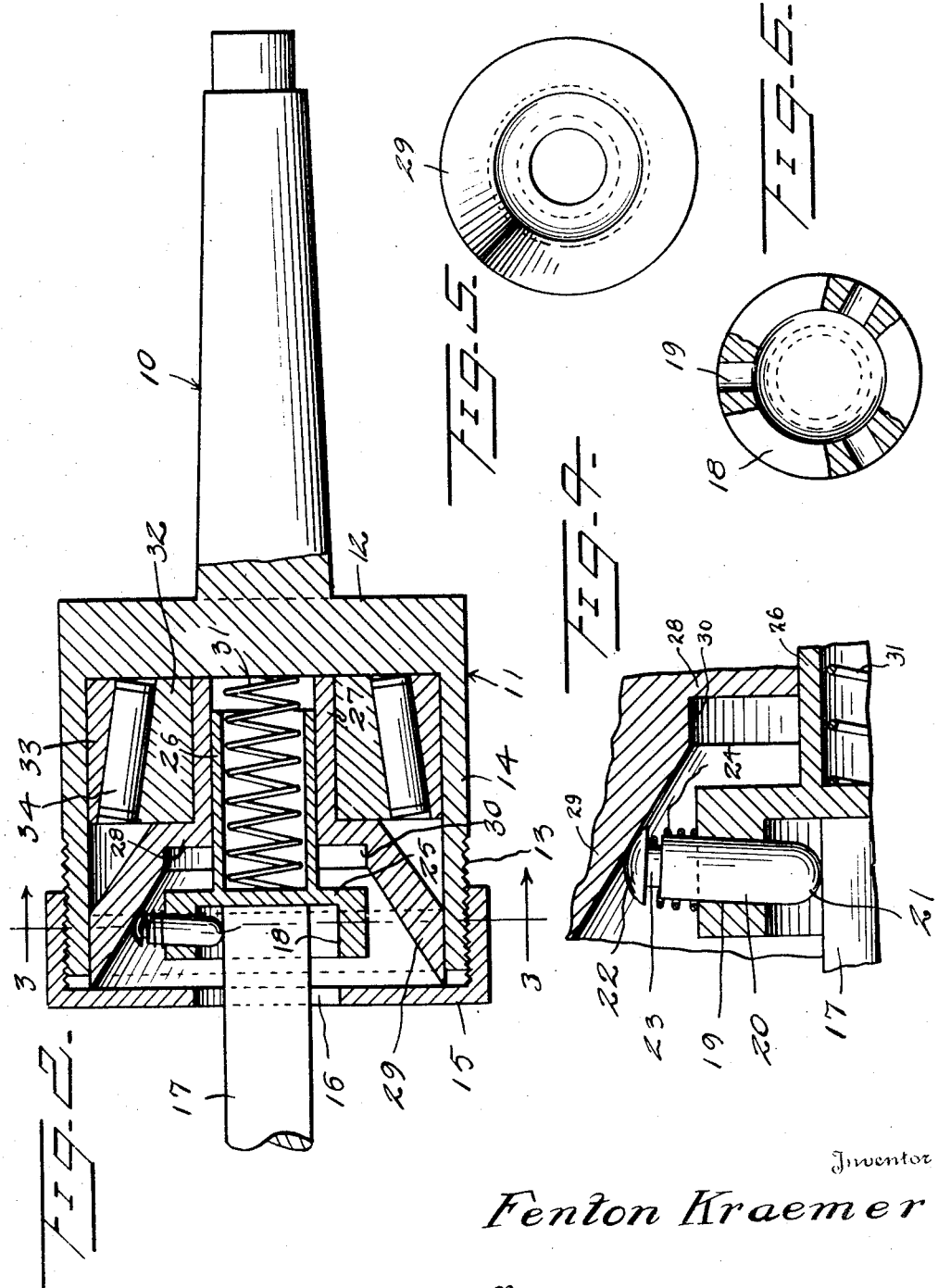
Inventor
Fenton Kraemer
By
Kimmel & Crowell Attorneys Patented Feb. 7, 1950

2,496,545

UNITED STATES PATENT OFFICE 2,496,545

LATHE CHUCK

Fenton Kraemer, Marysville, Kans.

Application November 21, 1946, Serial No. 711,293

2 Claims. (Cl. 82—33)

This invention relates to lathe chucks.

An object of this invention is to provide a lathe chuck which is particularly designed for mounting in the tail stock and will automatically center the work, the work being firmly and rotatably clamped to the device.

Another object of this invention is to provide a centering chuck for the tail stock of a lathe which can be mounted in a conventional tail stock, taking the place of the center point, the chuck including automatically adjustable work gripping jaws for gripping and centering the work.

A further object of this invention is to provide a centering chuck wherein a plurality of work clamping jaws are slidably carried by the body of the device and will automatically grip the work as the tail stock is moved toward the head stock, and will accurately center work of different diameters.

With the above and other objects in view, my invention consists in the arrangement, combination and details of construction disclosed in the drawings and specifications, and then more particularly pointed out in the appended claims.

In the drawings,

Figure 1 is a detail side elevation of a lathe chuck constructed according to an embodiment of this invention.

Figure 2 is a sectional view taken on the line 2—2 of Figure 1,

Figure 3 is a sectional view taken on the line 3—3 of Figure 2,

Figure 4 is a fragmentary enlarged sectional view taken on the line 4—4 of Figure 3, Figure 5 is a detail front elevation of the jaw operator, Figure 6 is a detail front elevation, partly broken away, of the jaw carrier, Figure 7 is a detail front elevation of the chuck, Figure 8 is a detail front elevation of the jaw carrier with the jaws and omitting the jaw operator.

Referring to the drawings, the numeral 10 designates generally an elongated tapered shank or spindle which is adapted to engage in the center point hole of a tail stock. The shank or spindle 10 has secured to or formed integral with the outer end thereof a cup-shaped housing 11 which is formed of an inner wall 12 and a cylindrical side wall 14 which is formed with threads 13. A cap 15 is threaded on the outer end of the housing 11 and is formed with a central opening 16 of relatively large size through which a round work piece 17 is adapted to be loosely extended. The housing 11 has disposed therein an annular jaw carrier 18 which is formed with a plurality of inclined openings 19 through which inclined jaws or work gripping members 20 are adapted to slidingly engage.

The jaws 20 are formed at their inner ends with rounded end portions 21 for engagement with the periphery of the work 17 and each jaw 20 includes a rounded head 22 offset from the outer end of the jaw 20 by means of a reduced diameter shank 23. A spring 24 engages about the jaw 20 and bears at its outer end against the head 22 to thereby constantly urge the jaw 20 outwardly to work releasing position.

The jaw carrier 18 is formed integral with a disk-shaped plate 25 which has extending inwardly therefrom a cylindrical member 26. The cylindrical member 26 is slidingly disposed in a cylindrical part 27 which is formed integral with and extends inwardly from the inner disk-shaped wall 28 of a tapered or frusto-conical jaw operator 29. The frusto-conical jaw operator 29 is loosely disposed within the cylindrical member 14 so that the jaw operator 29 may freely rotate within the cylindrical member 14.

The inner end of the jaw operator 29 includes an annular recess 30 within which the inner end of the jaw carrier 18 is adapted to loosely engage. A spring 31 is disposed within the cylindrical member or sleeve 26, bearing at its inner end against the wall 12 of the housing 11 and bearing at its outer end against the wall or plate 25 which is formed integral with the carrier 18. The cylindrical member or sleeve 27 is snugly disposed within the inside of an inner anti-friction race 32. An outer race 33 engages the inside of the cylindrical member 14 and the anti-friction members 34 are interposed between the two races 32 and 33 and in the present instance these anti-friction members 34 are constructed in the form of rollers.

In the use and operation of this chuck, the shank or spindle 10 is inserted in the tapered bore of the tail stock. The end of the work 17 is inserted through the opening 16 of the cap 15 so that it will engage within the work carrier 18. The work 17 will force the jaw members 20 outwardly in a radial direction and will also force these jaw members outwardly toward the large end of the jaw operator of compressor 29. The jaws 20 may be firmly engaged or gripped to the work 17 by moving the tail stock endwise in the direction of the work. This movement of the tail stock will cause the carrier 18 to be moved inwardly of the housing 11 and as the carrier 18 moves inwardly the jaws 20 will be moved radially toward the work 17, riding at their outer ends on the inner frusto-conical surface of the jaw compressor or operator 29.

By providing the anti-friction bearing for the jaw operator, the work 17 can freely rotate relative to the housing 11. With a construction as hereinbefore described, the work will be automatically centered relative to the axis of the tail stock spindle and the spindle of the head stock and at the same time it will not be necessary to provide a center hole in the work as is customary where a center point is used with the work. The outer wall of the cap 15 will provide a limit or stop means for limiting the outward movement of the jaw carrier 18 under the tension of the spring 31. The springs 24 will maintain the jaws 20 in contact with the inner surface of the compressor or operator 29 as the carrier 18 moves outwardly under the tension of the spring 31.

I do not mean to confine myself to the exact details of construction herein disclosed, but claim all variations falling within the purview of the appended claims.

What I claim is:

1. In a chuck having a shank and a housing fixed to and extending coaxially of one end of said shank, a jaw carrier in said housing, means mounting said carrier for combined endwise and rotary movement, a plurality of radially disposed cylindrical work gripping jaws slidably carried by said carrier, said carrier including an inner wall against which the work is adapted to engage to thereby move said carrier endwise and inwardly of said housing, a spring constantly urging said carrier outwardly of said housing, a jaw operator in said housing formed with a frusto-conical inner surface against which said jaws are adapted to engage whereby endwise movement of said carrier will thereby effect radial movement of said jaws, and springs constantly urging said jaws to engage said surface.

2. In a chuck having a shank and a housing fixed to and extending coaxially of one end of said shank, a jaw carrier in said housing, means mounting said carrier in said housing for combined endwise and rotary movement, a plurality of radially disposed cylindrical work gripping jaws slidable in said carrier, said carrier including an inner wall against which the work is adapted to engage to thereby move said carrier endwise and inwardly of said housing, a spring constantly urging said carrier outwardly of said housing, a jaw operator in said housing formed with a frusto-conical inner surface against which said jaws are adapted to engage whereby endwise movement of said carrier will thereby effect radial movement of said jaws, and anti-friction means in said housing correlated with said jaw operator.

FENTON KRAEMER.

REFERENCES CITED

The following references are of record in the file of this patent:

UNITED STATES PATENTS

| Number | Name | Date |
|---|---|---|
| 1,235,957 | Bidwell | Aug. 7, 1917 |
| 1,565,227 | Garrison | Dec. 8, 1925 |
| 1,806,344 | Goad | May 19, 1931 |

FOREIGN PATENTS

| Number | Country | Date |
|---|---|---|
| 50,205 | Germany | Jan. 2, 1890 |